US008887369B2

(12) United States Patent
Burrowes et al.

(10) Patent No.: US 8,887,369 B2
(45) Date of Patent: Nov. 18, 2014

(54) PERSONAL-CARE APPLIANCE AND METHOD OF ASSEMBLY

(75) Inventors: Lee Burrowes, Woking (GB); Paul Michael Jessemey, Lambourn (GB); Kevin James Wain, Reading (GB)

(73) Assignee: The Gillette Company, Boston, MA (US)

( * ) Notice: Subject to any disclaimer, the term of this patent is extended or adjusted under 35 U.S.C. 154(b) by 157 days.

(21) Appl. No.: 13/590,393

(22) Filed: Aug. 21, 2012

(65) Prior Publication Data

US 2013/0145601 A1 Jun. 13, 2013

Related U.S. Application Data

(60) Provisional application No. 61/568,895, filed on Dec. 9, 2011.

(51) Int. Cl.

| | |
|---|---|
| ***B26B 19/40*** | (2006.01) |
| ***B23P 11/00*** | (2006.01) |
| ***B65D 17/50*** | (2006.01) |
| ***B65D 41/02*** | (2006.01) |
| ***B65D 41/32*** | (2006.01) |

(52) U.S. Cl.
USPC ................... 29/453; 29/428; 29/434; 29/446; 29/447; 30/41; 220/260; 220/265; 220/266

(58) Field of Classification Search
CPC ......... B21D 39/03; B23P 11/00; B23P 11/02; B65D 25/10; B65D 41/00; B65D 43/00; B65D 41/02; B65D 17/50; B65D 41/32
USPC ................ 29/428, 447, 434, 446, 453; 30/41; 220/260, 265, 266, 752, 756
See application file for complete search history.

(56) References Cited

U.S. PATENT DOCUMENTS

| | | | | |
|---|---|---|---|---|
| 4,408,920 | A * | 10/1983 | Walther et al. | 401/176 |
| 4,844,641 | A * | 7/1989 | Grosfilley et al. | 401/176 |
| 5,134,775 | A * | 8/1992 | Althaus et al. | 30/41 |
| 6,047,862 | A * | 4/2000 | Davies | 222/145.3 |
| 6,308,413 | B1 | 10/2001 | Westerhof et al. | |
| 6,679,642 | B1 * | 1/2004 | Dillingham et al. | 401/184 |
| 7,121,754 | B2 * | 10/2006 | Bressler et al. | 401/264 |
| 7,178,241 | B1 * | 2/2007 | Cummings et al. | 30/41 |
| 7,182,542 | B2 * | 2/2007 | Hohlbein | 401/268 |
| 7,364,520 | B2 * | 4/2008 | Chauvin et al. | 473/566 |
| 2005/0036821 | A1 * | 2/2005 | Pfenniger et al. | 401/123 |
| 2006/0150386 | A1 * | 7/2006 | Wanli et al. | 29/449 |
| 2006/0272154 | A1 * | 12/2006 | Brevard | 30/41 |

(Continued)

FOREIGN PATENT DOCUMENTS

WO WO 00/78511 A1 12/2000

OTHER PUBLICATIONS

PCT International Search Report with Written Opinion in corresponding Int'l appln. PCT/US2012/068335 dated Mar. 8, 2013.

*Primary Examiner* — Essama Omgba
*Assistant Examiner* — Darrell C Ford
(74) *Attorney, Agent, or Firm* — Jay A. Krebs

(57) ABSTRACT

A personal-care appliance having a handle defining a cavity. A fluid connector is positioned within the cavity. A fluid reservoir is positioned within the cavity. The fluid reservoir has a frangible seal that is spaced apart from the fluid connector. A cover is mounted to the handle over the cavity.

10 Claims, 7 Drawing Sheets

(56) References Cited

U.S. PATENT DOCUMENTS

2009/0249628 A1* 10/2009 Hosseini et al. .................. 30/41
2010/0014909 A1 1/2010 Sampaio
2010/0175261 A1* 7/2010 Lax .................................. 30/41

* cited by examiner

PERSONAL-CARE APPLIANCE AND METHOD OF ASSEMBLY

CROSS REFERENCE TO RELATED APPLICATIONS

This application claims the benefit of U.S. Provisional application No. 61/568,895, filed Dec. 9, 2011.

FIELD OF THE INVENTION

The present invention relates to liquid dispensing personal-care appliances in general, and more particularly, to liquid dispensing shaving razors.

BACKGROUND OF THE INVENTION

Skin care can be of particular importance in improving or enhancing the appearance of men and women. Various products and methods can be used to care for skin. For example, exfoliant scrubs, cleansers, and lotions are sometimes used to maintain healthy-looking skin. Exfoliant scrubs can be used to remove dead skin cells from the surface of the skin, which can give the skin an improved tone. Soaps and other cleansers can be used to remove dirt and excess oil from the skin, which can help prevent clogging of pores. Consequently, acne and other types of skin blemishes can be prevented in some cases. Lotions and various other topical ointments can also be used to deliver nutrients and/or moisturizers to the skin in an effort to improve the appearance and/or the health of the skin. Other types of cosmetic products (e.g., creams and lotions) or drug actives are sometimes used in an attempt to eliminate wrinkling and other signs of aging.

The shaving process typically includes the application of a shaving aid material (e.g., shaving cream) to the surface and the separate step of shaving the hair using a razor assembly. The shaving aid material oftentimes includes at least one suitable agent (e.g., a lubricating agent, a drag-reducing agent, a depilatory agent, etc.) that enhances the shaving process. Most consumers find this type of preparation to be rather inconvenient because of the need for multiple shaving products, e.g., a wet shaving razor and a skin preparation product, as well as the undesirable necessity for multiple application steps during the wet shaving process. Furthermore, this process can be messy and requires the consumer rinse their hands after applying the shave gel. This multi-step process also results in an overall extended shaving experience which most consumers do not prefer given typical morning hygiene routines. It may, however, be desirable to apply liquids of other kinds to the skin before, during, or after shaving. It has been found that especially in the case of males who shave facial hair, it is important to provide a shave preparation of some sort prior to shaving in order to adequately hydrate the coarser facial hairs to allow for an easier and closer shave. It has been suggested in the literature to provide a shaving razor with a built in dispensing unit that releases a fluid (e.g., shaving aid) from a fluid container. However, these razors do not provide for simple and intuitive replacement and/or loading (e.g., activation) of the fluid container by the consumer.

SUMMARY OF THE INVENTION

In one aspect, the invention features, in general, a personal-care appliance having a handle defining a cavity. A fluid connector is positioned within the cavity. A fluid reservoir is positioned within the cavity. The fluid reservoir has a frangible seal spaced apart from the fluid connector. A cover is mounted to the handle over the cavity. The personal-care appliance may optionally include the fluid reservoir with an inner wall defining an opening. The personal-care appliance may also optionally include the fluid connector with an outer wall having at least one protrusion that engages the inner wall of the fluid reservoir. The personal-care appliance may optionally include a removable barrier between the frangible seal and the fluid connector.

In another aspect, the invention features, in general a method of making a liquid dispensing personal-care appliance by providing a handle having a fluid connector positioned within a cavity defined by the handle. A fluid reservoir having a frangible seal is positioned at least partially within the cavity of the handle. The frangible seal of the fluid reservoir is spaced apart from the fluid connector. A cover is mounted to the handle and the cover is secured to the handle concealing the cavity. The method may optionally include positioning a removable barrier between the frangible seal and the fluid connector.

The details of one or more embodiments of the invention are set forth in the accompanying drawings and the description below. Other features and advantages of the invention will be apparent from the description and drawings, and from the claims.

DETAILED DESCRIPTION OF THE INVENTION

The present disclosure is not limited to wet shaving razors, or even razors in general. It is understood that certain aspects of the present disclosure may also be used for dry electric shaving razors that have one or more rotating or reciprocating blades or other personal care appliances (e.g., toothbrushes, depilatory applicators, epilators, or other beauty applicators). Furthermore, it is understood that certain aspects of the present disclosure may be used independently for applying a liquid.

Figure 1A:
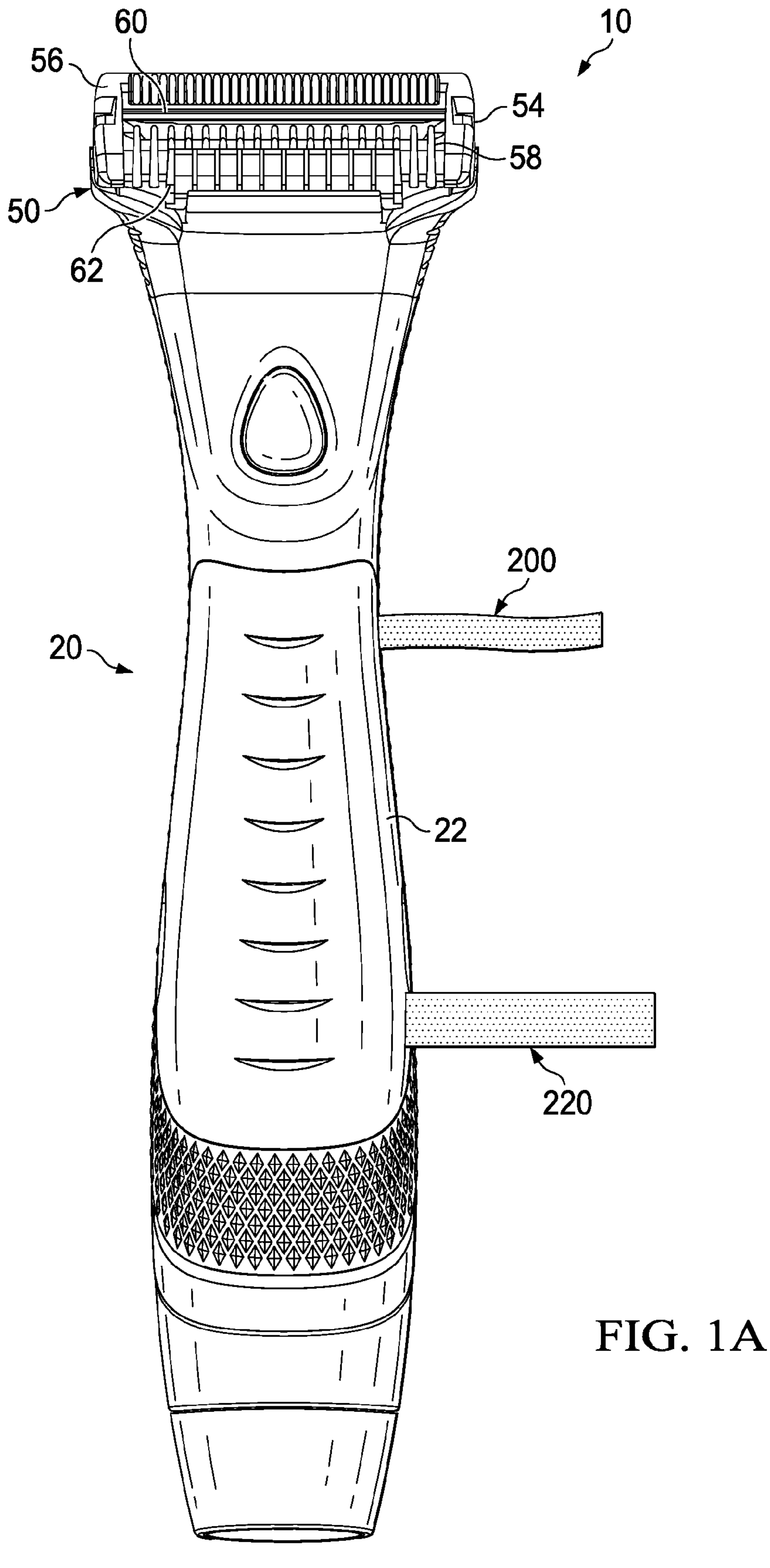
FIG. 1A is a front view of one possible embodiment of a personal-care appliance in a non-loaded position.

Referring to FIG. 1A, one possible embodiment of the present disclosure is shown illustrating a front view of a personal-care appliance 10. For example, the personal-care appliance may be a liquid dispensing razor (as shown), a toothbrush, a mascara brush, or any other personal-care appliance that dispenses a fluid. As will be described in greater detail below, the personal-care appliance 10 may include a handle 20 configured to receive a pump assembly (not shown) and a fluid reservoir (not shown). The handle 20 may have a cover 22 that protects and/or conceals the pump and/or fluid reservoir within the handle 20. The cover 22 may be mounted to the handle 20 and removably secured in place (e.g., snap fit to the handle 20). As will be described in greater detail below, a removable barrier 200 and/or a label 220 may be positioned between the handle 20 and the cover 22. In certain embodiments, the removable barrier 200 and/or a label 220 may include a film (e.g., a thin piece of plastic) that is removed prior use. A liquid dispensing cartridge 50 may be removably or fixedly mounted to the handle 20. A shaving razor cartridge 54 may be pivotably mounted to one end of the liquid dispensing cartridge 50. The shaving razor cartridge 54 may have a cap 56, a guard 58 in front of the cap 56, and one or more blades 60 between the cap 56 and the guard 58. The liquid dispensing cartridge 50 may include a fluid applicator 62 for delivering one or more fluids to a surface to be treated (e.g., shaved). For example, the fluid applicator 62 may be mounted to the shaving razor cartridge 54 (e.g., the guard 58) to apply and spread the fluid to the surface to be treated (e.g., skin or hair) during a stroke of the personal-care appliance 10 against the skin.

Figure 1B:
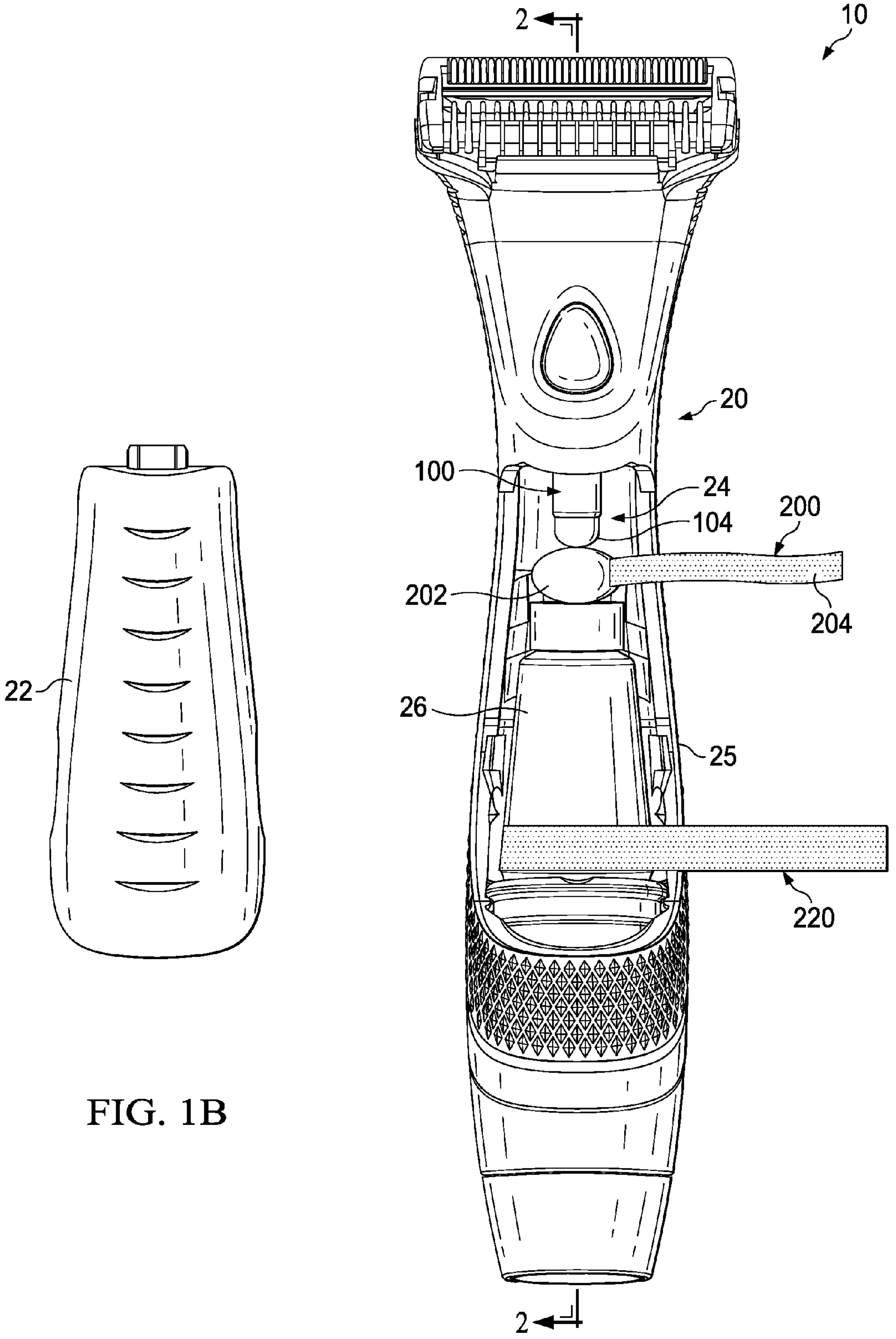
FIG. 1B is a partial assembly view of the personal-care appliance of FIG. 1A.

Referring to FIG. 1B, a partial assembly view of the personal-care appliance of FIG. 1A is illustrated with the cover 22 removed from the handle 20. The personal-care appliance 10 of FIG. 1B is shown with the fluid reservoir 26 within the cavity 24 in an unloaded position. A fluid (e.g., a lotion or gel) may be held within a fluid reservoir 26. The fluid reservoir 26 may held permanently within the handle 20 after the fluid reservoir is loaded (e.g., fluid communication is established between the fluid reservoir and the fluid applicator 62). After the fluid is consumed, the consumer may dispose of the personal-care appliance 10. Alternatively, fluid reservoir 26 may be removed and replaced after the fluid is consumed. The handle 20 may define a cavity 24 configured to receive the fluid reservoir 26. In certain embodiments, the fluid reservoir 26 may be a delaminating bottle or a sachet. In other embodiments, the fluid reservoir 26 may be a blow molded or injection molded plastic bottle. A fluid connector 100 may removably engage the fluid reservoir 26 to establish fluid connection between the fluid reservoir 26 and the fluid applicator 62. An outer wall 102 of the fluid connector 100 may seal against an inner wall 28 of the fluid reservoir 26 to prevent fluid from leaking into the handle 20. The fluid connector 100 may included a tip 104 configured to pierce a seal (not shown) of the fluid reservoir 26 to establish a fluid connection between the fluid applicator 62 and the fluid reservoir 26. In certain embodiments, the tip 104 may be beveled and/or angled (e.g., pyramidal, conical) to facilitate the penetration of the seal.

The fluid reservoir 26 may be spaced apart from the fluid connector 100 in the unloaded position. In certain embodiments, at least a portion of the removable barrier 200 may be positioned between the fluid reservoir 26 the fluid connector 100 to prevent premature engagement of the fluid connector 100 and the fluid reservoir 26. For example, one end of the removable barrier 200 may include a cap 202 that is positioned between the fluid reservoir 26 the fluid connector 100. The removable barrier 200 (e.g., cap 202) may be in direct or indirect contact with either the fluid reservoir 26 and/or the fluid connector 100. At least a portion of the removable barrier 200 may be positioned outside the cavity 24 prior to mounting of the cover 22 to the handle 20. For example, the removable barrier 200 may include a tab 204 that extends from the cap 204 and is positioned outside of the cavity 24. The cover 22 may be mounted and/or secured to the handle 20 with the tab 202 positioned between the cover and an outer wall 25 of the handle 20. The tab 204 may direct or indicate to the consumer to remove the cover 22 and load the fluid reservoir 26 to activate the fluid reservoir 26. In certain embodiments, at least a portion of the label 220 may be removably secured to the fluid reservoir 26. The label 220 may also direct or indicate to the consumer to remove the cover 22 and load the fluid reservoir 26 to activate the fluid reservoir 26. The label 220 may be positioned between the outer wall 25 of the handle 20 and the cover 22 prior to mounting the cover 22. The cover 22 may then be mounted and/or secured to the handle 20 with the label 220 positioned between the outer wall 25 of the handle 20 and the cover 22. The label 220 may facilitate retaining the fluid reservoir 26 in a rear position within the cavity 24 to prevent the fluid connector 100 from inadvertently establishing fluid communication.

Figure 2:
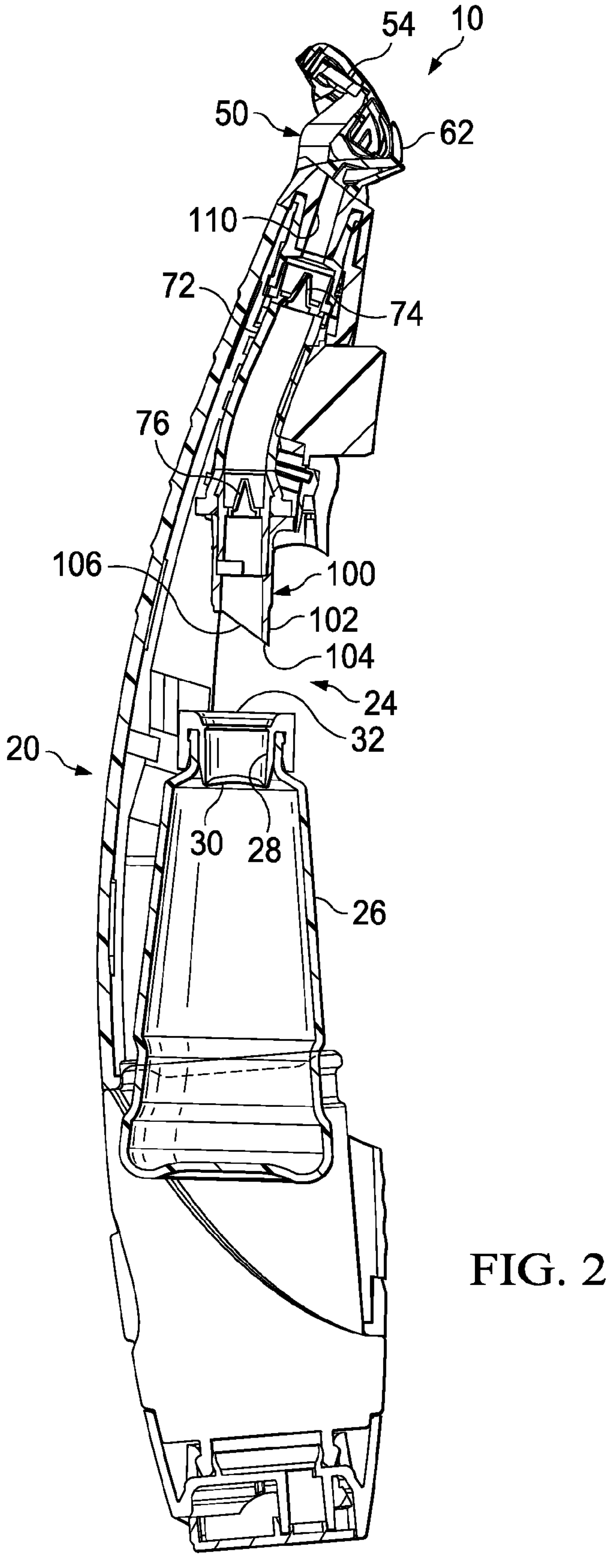
FIG. 2 is a cross section view of the personal-care appliance, taken generally along the line 2-2 of FIG. 1B.

Referring to FIG. 2 a cross section view of the personal-care appliance 10, taken generally along the line 2-2 of FIG. 1B is shown with the removable barrier 200 and the label 220 removed for clarity. A fluid (e.g., a lotion or gel) may be held within the fluid reservoir 26 positioned within the cavity 24. The fluid reservoir 26 may have a frangible seal 30 to prevent contamination (e.g., bacteria) of the fluid held within the fluid reservoir 26 and leakage of the fluid from the fluid reservoir. The fluid reservoir 26 may be positioned toward the rear of the cavity 24. In the unloaded position, the fluid connector 100 may be spaced apart from the frangible seal 30. For example, in certain embodiments, the fluid connector 100 may be positioned within an opening 32 of the fluid reservoir 26, but not in contact with the frangible seal 30. The fluid connector 100 and/or the fluid reservoir 26 may have one or more protrusions to prevent the tip 104 of the fluid connector 100 from inadvertently contacting and/or penetrating the frangible seal 30. The consumer may remove the cover 22 (not shown) and slide the fluid reservoir to a forward position to penetrate the frangible seal 30 with the tip 104 of the fluid connector 100. The force required to overcome the interference between the outer wall 102 of the fluid connector 100 and an inner wall 28 of the fluid reservoir 26 may be greater than forces exerted under normal shipping and handling conditions.

Figure 3:
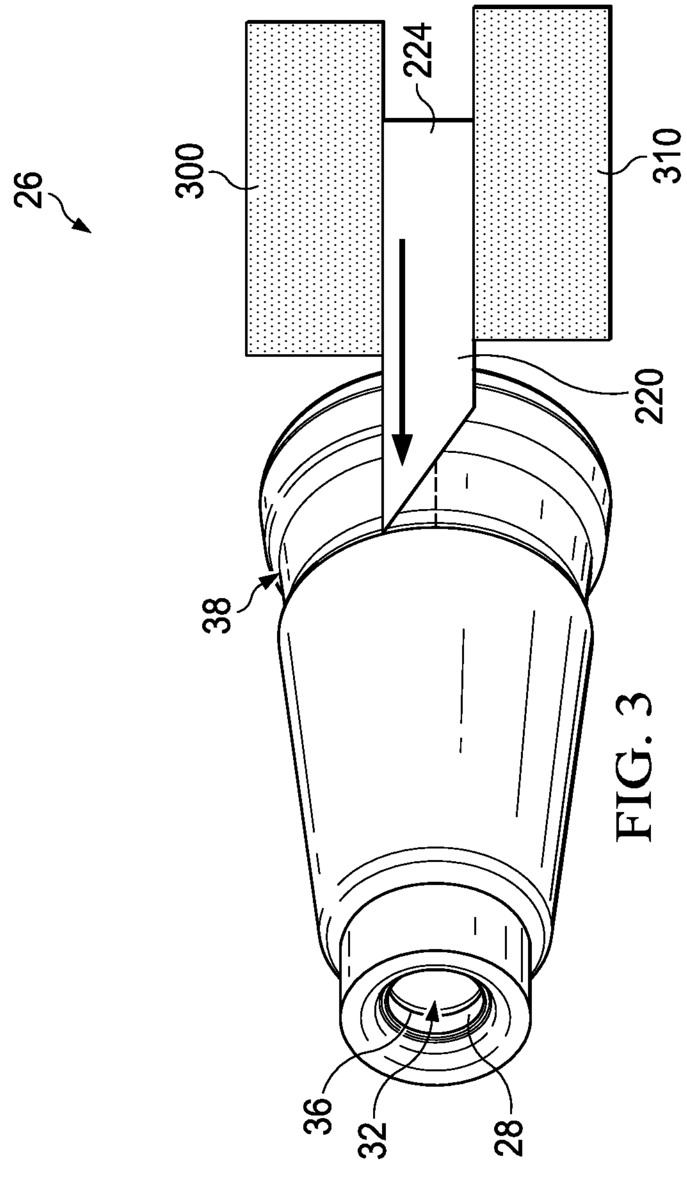
FIG. 3 is a perspective of one possible embodiment of a fluid reservoir that may be incorporated into the personal-care appliance of FIG. 1A.

Referring to FIG. 3, a perspective view of the fluid reservoir 26 is shown. The inner wall 28 of the fluid reservoir may have one or more protrusions 36 (e.g., an annular rib) that engage the fluid interconnector 100. The protrusion 36 may prevent inadvertent loading of the fluid reservoir 26. The protrusion 36 may also help retain the fluid connector 100 within the fluid reservoir 26 once the fluid reservoir is loaded (e.g, the frangible seal 30 is broken). The label 220 is shown detachably secured to the fluid reservoir 26. The label 220 may be a film (e.g., a heat shrinkable film). For example, the label 220 may be positioned around and/or secured the fluid reservoir 26. The label 220 may be secured to the fluid reservoir by adhesive or by heat shrinking. In certain embodiments, the fluid reservoir may have a groove 38 to hold the label 220 in place. Heat may then be applied to shrink the label 220 securely to the fluid reservoir 26. A portion of the label 220 may be clamped between a pair of plates 300 and 310 during the heating process. The plates 300 and 310 may act as a heat sink to prevent shrinkage of at least a portion of the label 220 (e.g., the portion of the label 220 that extends outside of the handle 20.

Figure 4:
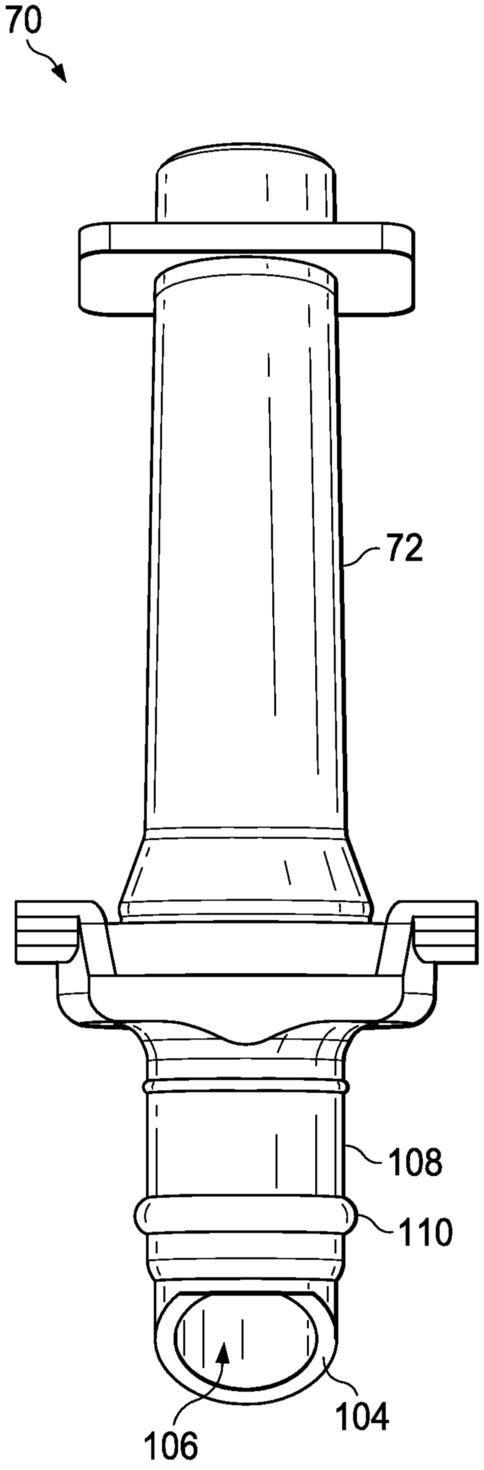
FIG. 4 is a front view of one possible embodiment of a pump assembly that may be incorporated into the personal-care appliance of FIG. 1A.

Referring to FIG. 4, a perspective view of a pump assembly 70 is shown that may be incorporated into the personal-care appliance 10. The fluid connector 100 (e.g., tip 104) may pierce the frangible seal 30 of the fluid reservoir 26 (not shown) to establish a fluid connection between the fluid applicator 62 (not shown) and the fluid reservoir 26. Accordingly, fluid is directed within an opening 106 of the fluid connector 100, which is in fluid communication with a pump assembly 70. The pump assembly 70 may include an elongated resilient tube 72 that pumps fluid from the fluid reservoir 26 through a pair of valves (not shown) to the fluid applicator 62 (not shown). The outer wall 102 of interconnect member 100 may include a barrel 108 having with one or more protrusions 110 (e.g., an annular rib). The protrusion 110 may prevent inadvertent loading (i.e., piercing of the frangible seal 30) of the fluid reservoir 26. The protrusion 110 may also help retain the fluid connector 100 within the fluid reservoir 26 once the fluid reservoir is loaded. In certain embodiments, the protrusion 110 of the interconnect member and the protrusion 36 of the fluid reservoir 26 may provide feedback to the consumer signaling the fluid reservoir 26 is properly loaded (e.g., an audible click as the protrusion the protrusion 110 of the interconnect member and the protrusion 36 of the fluid reservoir 26 slide over each other).

Figure 5:
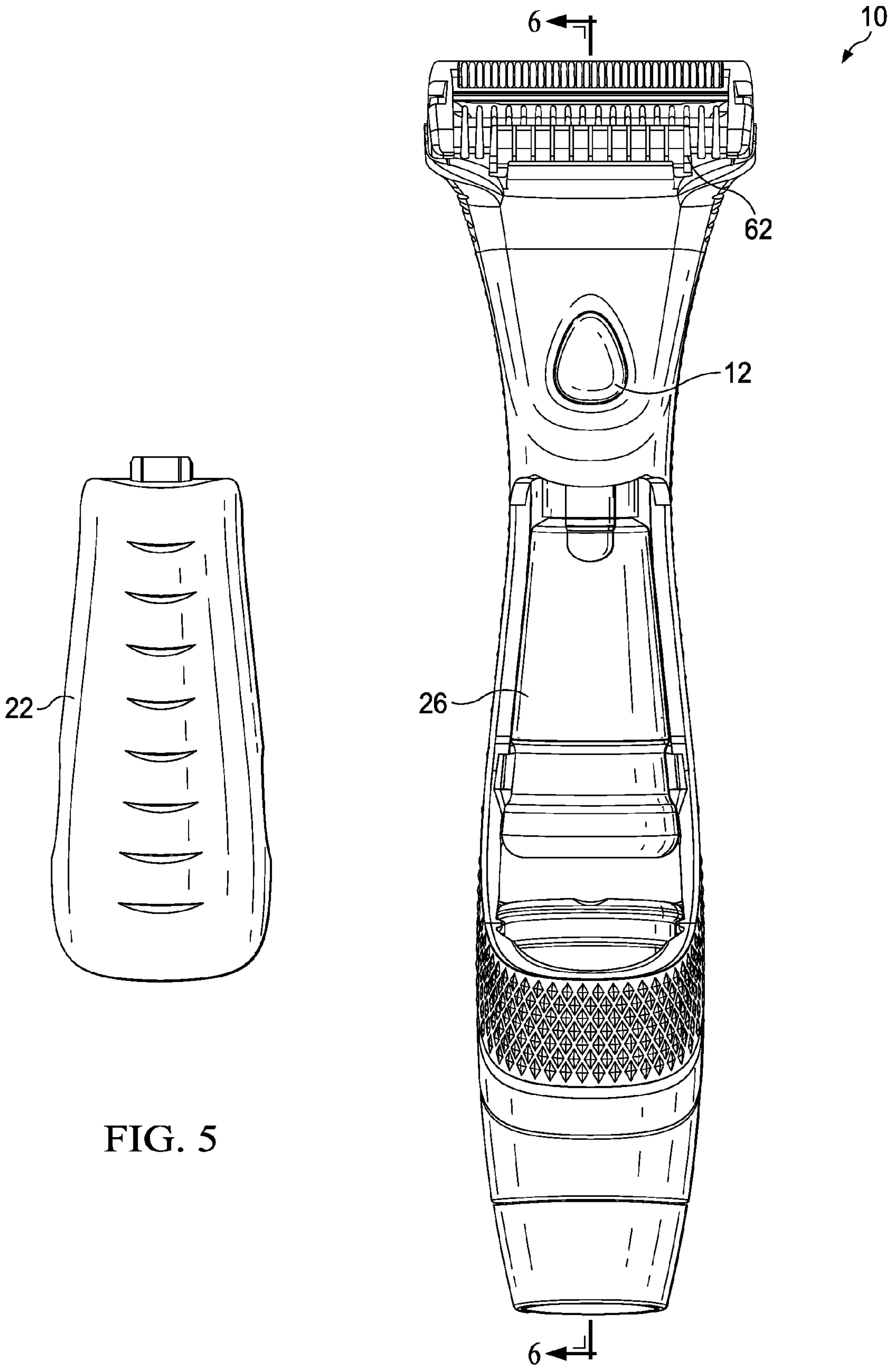
FIG. 5 is a partial assembly view of the personal-care appliance of FIG. 1A in a loaded position.
Figure 6:
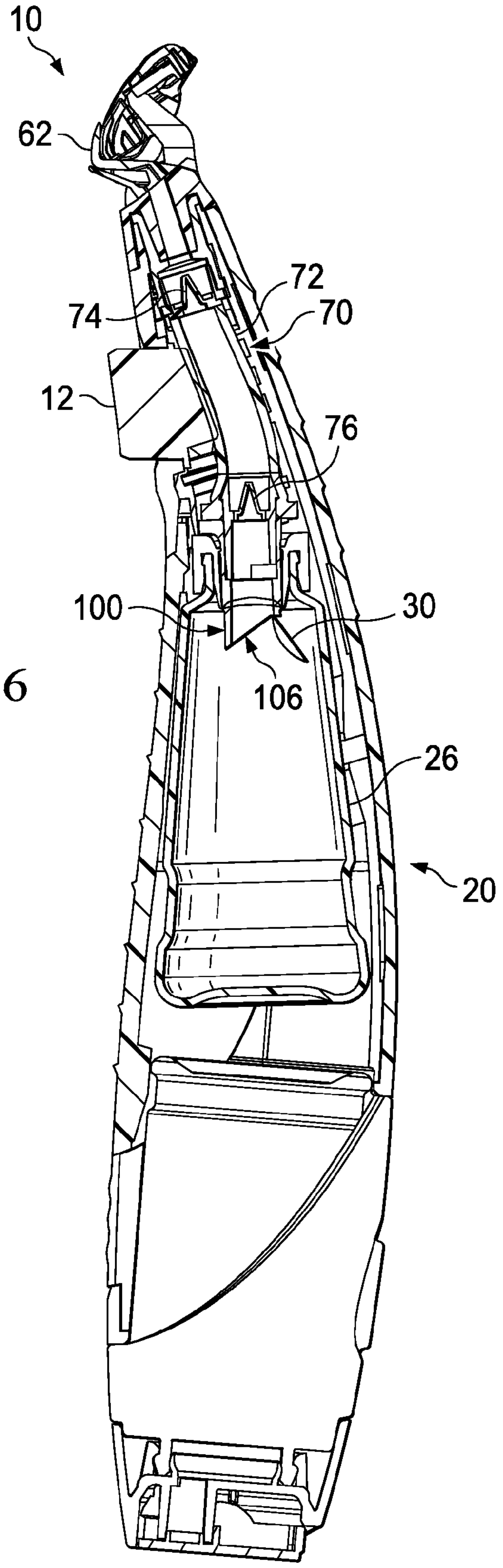
FIG. 6 is a cross section view of the personal-care appliance, taken generally along the line 6-6 of FIG. 5.

Referring to FIGS. 5 and 6, the personal-care appliance 10 is illustrated with the fluid reservoir 26 in the loaded position. FIG. 5 is a front partial assembly view of the personal-care appliance 10 with the cover 22 removed from the handle 20 to show the fluid reservoir 26. FIG. 6 is a cross section view of the handle 20, taken generally along the line 6-6 of FIG. 5 (with the cover 22 mounted to the handle 20). The consumer may take away the removable barrier 200 and/or the label 220 (see FIGS. 1A and 1B) and slide the fluid reservoir 26 forward to the loaded position. The fluid connector 100 may engage the fluid reservoir 26 to establish fluid connection (e.g., the fluid connector 100 may rupture the frangible seal 30). Accordingly, fluid is directed within the opening 106 of the fluid connector 100, which is in fluid communication with the pump assembly 70 and the fluid applicator 62. The pump assembly 70 may include the elongated resilient tube 72 that pumps fluid from the fluid reservoir 26 through a pair of valves 74 and 76 to the fluid applicator 62. The outer wall 102 of the fluid connector 100 may seal against an inner wall 28 of the fluid reservoir 26 to prevent fluid from leaking into the handle 20.

An actuator 12 (e.g., a button) may facilitate pumping of the fluid from the fluid reservoir 26 to the fluid applicator 62. For example, the actuator 12 may compress the resilient elastomeric tube 72 to open the first valve 74 and release a predetermined dosage of fluid to the applicator 62. The actuator 12 may be released to return the resilient elastomeric tube 72 to its uncompressed state. The first valve 74 may close to prevent contamination and the second valve 76 may open to fill the resilient elastomeric tube 72 with fluid for the next release by the actuator 12. The actuator 12 may also facilitate pivoting of the fluid connector 100 for improved loading and unloading of the fluid reservoir 26.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as “40 mm” is intended to mean “about 40 mm.” Furthermore, dimensions should not be held to an impossibly high standard of metaphysical identity that does not allow for discrepancies due to typical manufacturing tolerances. Therefore, the term “about” should be interpreted as being within typical manufacturing tolerances.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of making a liquid dispensing razor comprising:
- providing a handle comprising a fluid connector positioned within a cavity defined by the handle;
- positioning a fluid reservoir at least partially within the cavity of the handle, the fluid reservoir having an inner wall defining an opening and a frangible seal within the opening wherein the frangible seal of the fluid reservoir is spaced apart from the fluid connector;
- positioning a removable barrier between the frangible seal and the fluid connector;
- mounting a cover to the handle; and
- securing the cover to the handle concealing the cavity.

2. The method of claim 1 further comprising mounting a fluid dispensing cartridge to the handle wherein the fluid dispensing cartridge includes a shaving razor cartridge.

3. The method of claim 1 wherein said securing includes snap fitting.

4. The method of claim 1 wherein the removable barrier comprises a film.

5. The method of claim 4 wherein at least a portion of the removable barrier is positioned between an outer wall of the handle and the cover after the cover is secured to the handle.

6. The method of claim 1 wherein the removable barrier comprises a cap.

7. The method of claim 6 further comprising a tab extending from the cap.

8. The method of claim 7 wherein the tab is positioned between an outer wall of the handle and the cover after the cover is secured to the handle.

9. The method of claim 1 further comprising removably securing a label to the fluid reservoir, wherein at least a portion of the label is positioned between an outer wall of the handle and the cover after the cover is secured to the handle.

10. The method of claim 9 wherein securing comprises heat shrinking at least a portion of the label to the fluid reservoir.

* * * * *